United States Patent
Christison et al.

[11] 3,907,075
[45] Sept. 23, 1975

[54] BRAKE MECHANISM FOR WINCH DRUMS

[75] Inventors: Sommerville G. Christison, Delta; Michael P. Smyth, Surrey, both of Canada

[73] Assignee: Gearmatic Company, Ltd., Surrey, Canada

[22] Filed: Dec. 26, 1973

[21] Appl. No.: 427,987

[52] U.S. Cl. ............. 188/77 W; 188/105; 188/170; 192/81 C; 192/83; 192/91 R; 254/186 R
[51] Int. Cl.² ........................................ F16D 49/06
[58] Field of Search ... 188/77 R, 77 W, 105, 106 P, 188/106 R, 170, 171; 192/81 R, 81 C, 80, 83, 91 R; 254/186 HS, 186 R; 242/156

[56] References Cited
UNITED STATES PATENTS

| | | | |
|---|---|---|---|
| 801,728 | 10/1905 | Lindsay | 192/81 R X |
| 2,569,479 | 10/1951 | Lonngren | 188/170 X |
| 2,689,030 | 9/1954 | Wemp | 188/170 X |
| 3,756,564 | 9/1973 | Murray et al. | 188/77 R X |

FOREIGN PATENTS OR APPLICATIONS

| | | | |
|---|---|---|---|
| 1,159,276 | 12/1963 | Germany | 188/77 W |

Primary Examiner—George E. A. Halvosa
Attorney, Agent, or Firm—Seed, Berry, Vernon & Baynham

[57] ABSTRACT

This invention relates to a brake mechanism for winch drums wherein the brake is normally applied and two independent brake release devices are provided to release the drum for rotation. The primary brake release completely frees the drum for "free spooling" rotation and the secondary brake release partially releases the brake restraining elements but maintains a relatively heavy braking drag on the drum to restrain the paying out of the cable from the drum except when subjected to a substantial pulling force on the cable.

13 Claims, 5 Drawing Figures

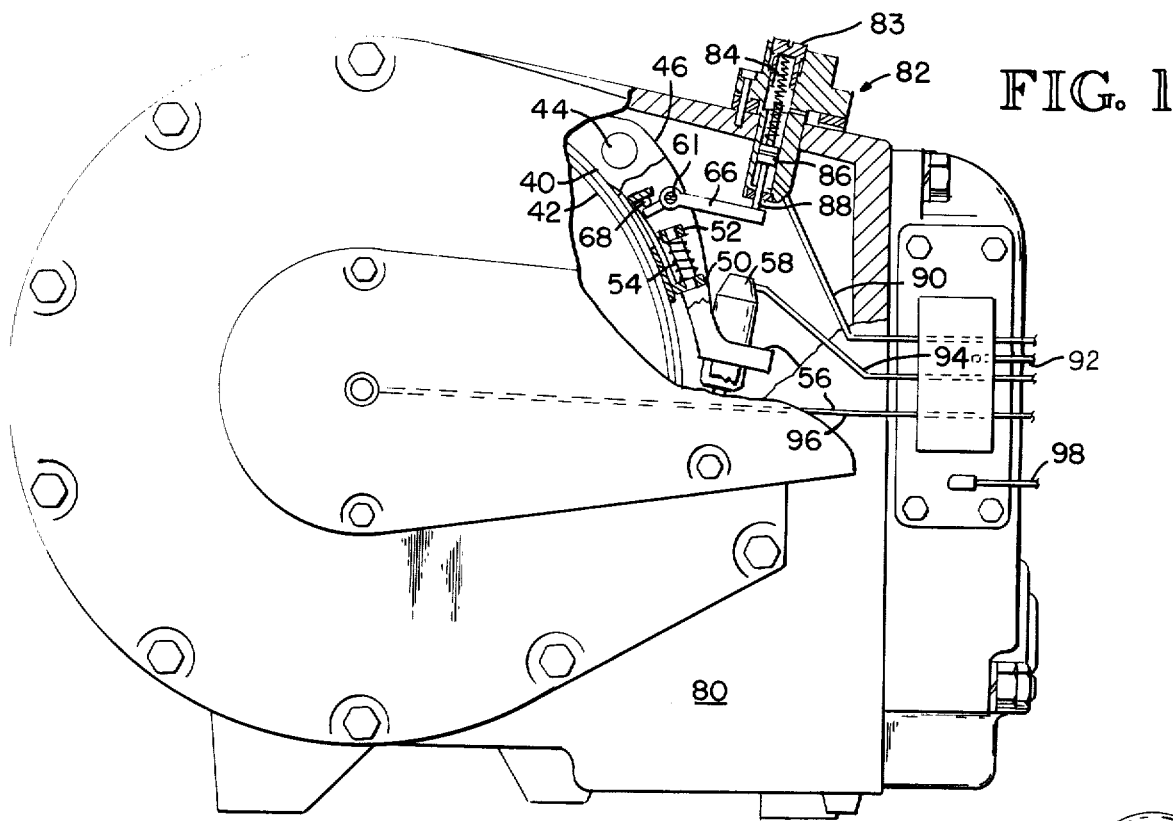
FIG. 1
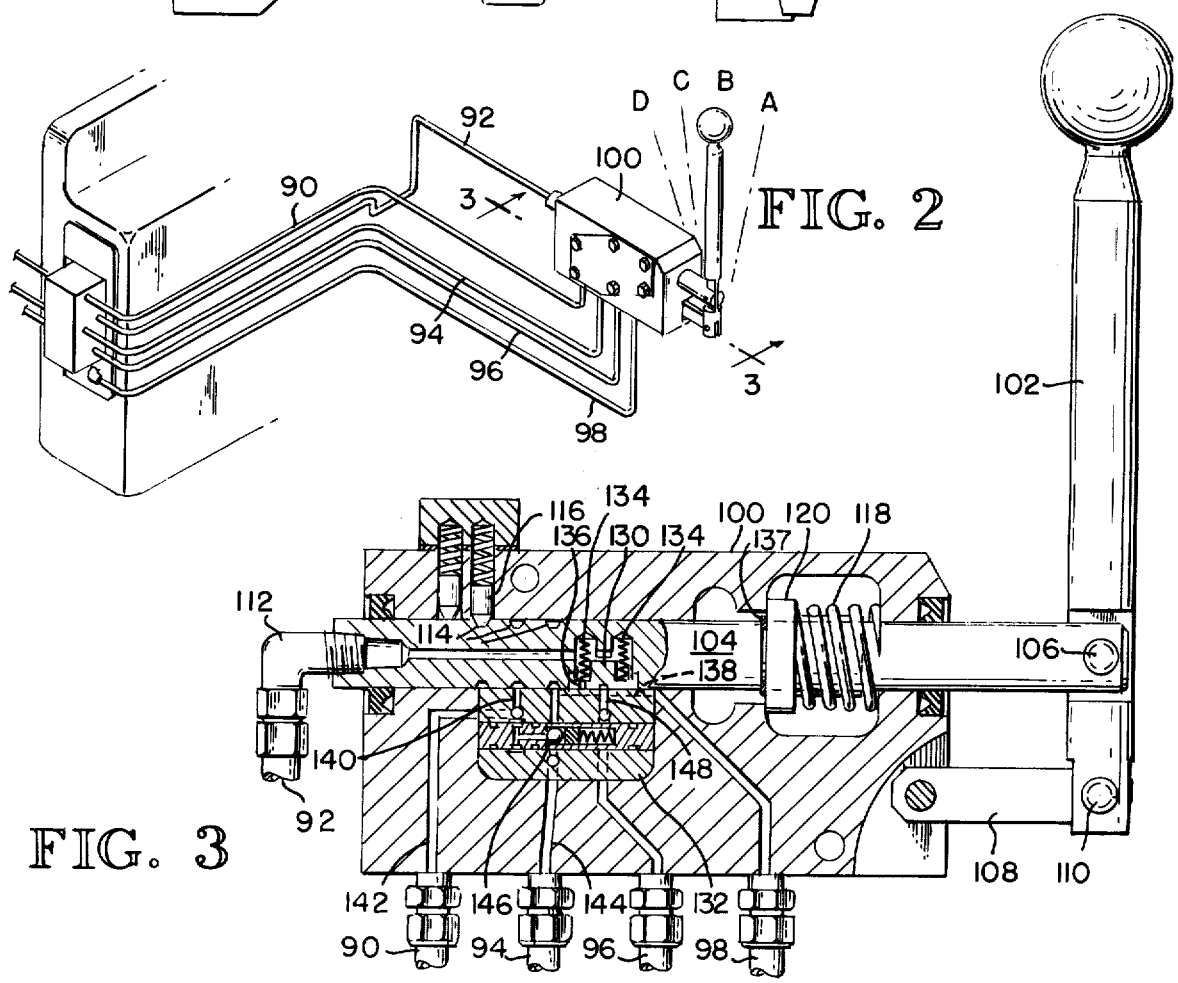
FIG. 2
FIG. 3

BRAKE MECHANISM FOR WINCH DRUMS

BACKGROUND OF THE INVENTION

This application relates to an improved braking system to be incorporated in winches similar to the winch illustrated in U.S. Pat. No. 3,756,564 issued Sept. 4, 1973.

Some of the primary requirements of winch operators, particularly as relates to tractor mounted winches used in the logging industry is that the winches be compact in size, have adequate winching power and, further, be capable of applying variable braking force. The winch must also include the capability of locking the drum against any rotation thus enabling the winch-carrying vehicle to pull a load of logs to a landing or the like.

In the prior art, the winch mechanisms have utilized a plurality of brake bands or a single brake band having a relatively large contact area. In addition to having the required braking force, it is desirable that the braking means provide the option for unwinding the cable from the drum when a relatively heavy drag or braking force is applied to the drum.

One of the disadvantages with a control which provides only a controlled modulated braking force is that the operator must concentrate on controlling the amount of braking force applied while at the same time driving the vehicle. A logging vehicle such as a log skidder will bounce around a great deal on a rough road making it difficult for an operator to effectively meter pressure from a modulating braking valve.

Provision of means so that the cable may be permitted to unwind from the drum under a weight or pulling force greater than required for "free spooling" also becomes important in instances when the operator desires to leave the load secured to the cable at a location while he drives his vehicle through an extremely muddy area or over an impediment. If the winch control is placed on the "brake release" during this time, the cable often has a tendency to unwind too quickly and thus "birdcage", which is undesirable and dangerous. Therefore, it is desirable to have a winch which includes braking means that includes a drag release wherein a controlled predetermined amount of brake pressure is applied, thereby keeping the cable taut, but not of sufficient pressure to retard the forward movement of the vehicle or lowering of a raised load.

Prior art devices known to the inventors which deal with braking apparatus for winch-like applications or the controls thereof are: U.S. Pat. No. 2,667,240, granted Jan. 26, 1954, to Wilkinson, et al.; U.S. Pat. No. 2,958,341, granted Nov. 1, 1960, to Grob; U.S. Pat. No. 3,529,702, granted Sept. 22, 1970, to Eckstein, Jr. The British Pat. No. 1,082,010, published Sept. 6, 1967, deals with the utilization of two brake bands upon a rotating winch structure, as well as the controls therefor.

With the above-noted problems and prior art in mind, it is another object of the present invention to provide a brake means utilized for two separate and distinct braking functions. The first braking function being a complete "brake on" condition wherein the winch drum is completely held against rotation wherein the brake band exerts a great deal of frictional resistance. The second braking function is a drag condition whereby the operator can place the brake controls in the appropriate position and the brake will allow the winch drum to turn upon the application of sufficient predetermined force but will not allow the drum to "free spool."

Yet another object of the present invention is to provide a control system for a winch wherein the control system has a single, shear seal valve seat and allows the operator to operate the clutch, put the brake in either one of the two possible positions and, once the control is in the designated position, direct his attention to other functions such as driving the vehicle.

BRIEF DESCRIPTION OF THE DRAWINGS

Fig. 1 is an environmental view of a winch which could use a double-wrap band, with portions broken away for clarity.

FIG. 2 is a representation of the controls for the winch as seen in FIG. 1.

FIG. 3 is a sectional view of the control valve illustrated in FIG. 2 taken along line 3—3.

DETAILED DESCRIPTION OF THE DRAWINGS

Figure 4:
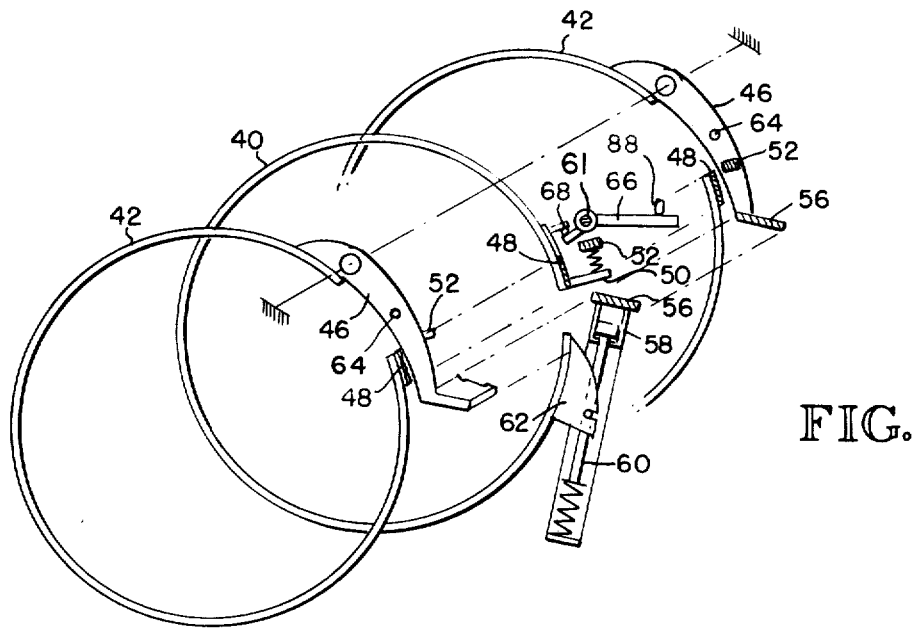
FIG. 4 is a schematic, spaced apart representation of the double-wrap brake band of FIG. 5.
Figure 5:
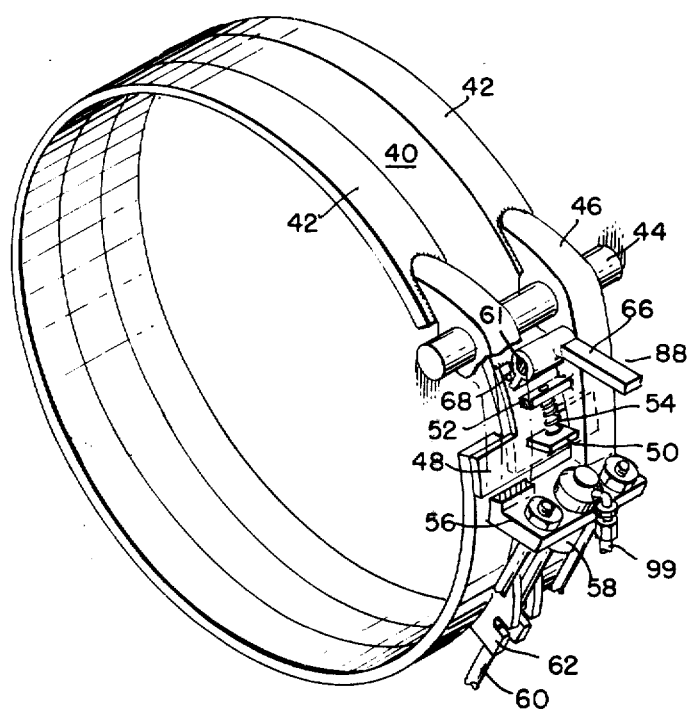
FIG. 5 is a pictorial representation of a unique, double-wrap band which includes mechanism to provide the dual braking function.

Referring to FIGS. 4 and 5 simultaneously, it can be seen that the multiple wrap brake band includes a single control band 40, hereinafter referred to as the primary band, which is of a generally circular configuration to conform to a drum. The primary band 40 is located between a pair of secondary bands 42—42 of similar configuration and which are rendered operational by the controlled release of the primary band 40. The present brake was primarily designed for use upon a winch and is equipped with a spring-on, hydraulic release control. In the case of a winch, it is far more desirable to have the brake lock the drum against rotation in the event of a loss of control. The spring applied "brake on" feature is, therefore, included, but it should be noted that these elements could be reversed. The brake drum has been eliminated for clarity of illustration. The secondary bands 42 are secured to the housing 80 by means of a pin 44 which extends through brackets 46—46 welded to the outer surfaces of each of the secondary bands.

The primary band 40 does not form a complete loop and has secured to its anchor end a rigid connecting bar 48 which interconnects the primary and secondary bands. Connecting bar 48 has an outwardly projecting arm 50 secured thereto. Mounted to the opposing surfaces of brackets 46—46 on the secondary bands and extending therebetween is a rigid bar 52. A compression spring 54 is mounted between the bar 52 and the arm 50 on the primary band thus continuously urging the secondary band to a larger circumference and providing constant releasing pressure on the secondary bands.

The brackets 46—46 on the secondary bands extend circumferentially beyond the bar 52 and terminate in an outwardly extending support member 56 which is integral with and bridges the distance between and is rigidly affixed to the brackets 46—46. A hydraulic cylinder 58 is mounted on and depends from support member 56 intermediate the ends thereof. A piston rod 60 extends from the hydraulic cylinder and engages ears 62 which extend from the outer surface of the primary band.

Mounted between the brackets 46—46 in the holes 64—64 is a rod 61. Rotatably mounted on the rod 61 is a bell crank 66 one end of which applies pressure against a pin 68 which is secured adjacent to the anchor end of the primary band 40. This pressure is transmitted to the primary ends of the secondary bands through the bar 48 which is rigidly secured to the respective bands. Pressure is exerted against the bell crank 66 from the spring engaged and hydraulically released drag cylinder 82. The spring 84 provides downward pressure on the piston 86 from which the rod 88 extends and engages the elongated end of the bell crank 66. The transmission of the force through the bar 48 to the secondary bands 42—42 provides a reduced braking force or heavy drag on the winch drum thereby retarding or preventing rotation of the drum until the force from the cable exceeds the predetermined pressure established for the heavy drag setting. With the incorporation of this additional braking feature the operator of the winch may drop his load or drive away from the load without having the cable upon the winch "birdcage". As seen in FIG. 1, the preferred embodiment of the brake control system is mounted upon a winch and, as depicted in this figure, comprises a housing 80 which, as described in U.S. Pat. No. 3,756,564 encloses all of the control mechanisms with the exception of the control valve and operating handle.

As best illustrated in FIG. 1 the primary brake release cylinder is mounted on the bracket 56. The drag brake release cylinder is mounted to project through the upper wall of the housing 80. The drag pressure adjustment can be made by adjustment of the adjusting screw 83 which engages the spring 84. The drag braking pressure is released by the application of hydraulic pressure against the piston 86 which reduces or eliminates the force applied on the bell crank 66.

Referring now to FIGS. 1 and 2, the controls which will be located adjacent to the operator of the vehicle are shown with their interconnections with the operating mechanisms of the winch. The controls include four separate positions: position A, whereat the clutch is engaged and the winch drum activated; position B, which is the "brake on" position; position C, which is the position whereat a heavy braking drag is provided on the winch drum; and position D, whereat the winch drum is free to rotate at will. The lines which interconnect the controls with the operating mechanisms include the line 90 which provides pressure to release the heavy drag mechanism; line 92 is the hydraulic supply line; line 94, provides pressure to release the brake release cylinder 58; line 96, provides pressure to actuate the clutch; and line 98 serves as the return to tank or reservoir.

The valve mechanism is illustrated in FIG. 3 and comprises a housing 100, operating handle 102 and a slide valve 104 which is pivotally connected to the handle 102 by pin 106. The lower end of handle 102 is pivotally mounted to the valve housing by means of a rigid link 108 and pivot pin 110. The hydraulic fluid under pressure is provided coaxially with valve spool 104 and enters through inlet port 112. The control valve is shown in neutral position, which would be the "brake on" position. In this position, which is the position normally assumed by the operator during operation of the vehicle, no hydraulic fluid is passed through the valve.

As previously stated the brake mechanisms are spring-engaged and hydraulically released, and, therefore, no fluid pressure is required to restrain rotation of the drum. The spool 104 includes a plurality of grooves 114 to interact with spring pressed pins 116 such that the three positions, "free spool," "drag," and "brake on," are locked in position whereas the fourth position, that which actuates the clutch, is a position which must be held by the operator of the vehicle. The spool is continuously urged from the clutch engage position A to the neutral position B by means of spring 118 mounted between a wall of the housing 100 and the ring 120 which is retained in position by snap ring 137 mounted in a groove in the spool. The valve spool is not spring biased in positions C and D nor in position B in the brake release direction. The spool is able to slide to the left inside ring 120 without any influence from the spring. It is held in positions B, C and D by the detents 116.

The control valve as noted above has four separate hydraulic positions and, as can be seen in this view, the hydraulic line 90 to the drag brake assembly corresponds with the illustration in FIG. 1 and the clutch actuation is denoted 96, and return to the tank is 98, and the main brake release is denoted as 94 in conformance with the brake release as shown in FIG. 1. A shear seal valve seat conduit line is provided within the spool and includes a flexible sealing element 130 which is spring-biased against a valve block 132 which has a plurality of ports bored therein. The valve seat is continuously urged against the valve block by means of compression springs 134 and includes a single port 136 which is selectively placed in communication with the ports in the valve block 132. The remainder of valve seat 130 is solid, thus closing the ports not in use, with the exception of a small groove 138 which permits escape of hydraulic fluid from the actuating line to return to the tank when the valve has been moved to another position.

The valve block includes a first port 140 which causes fluid to flow outwardly through the passage 142 to the heavy drag release cylinder 82 as well as outwardly through passage 144 to the main brake release cylinder 58. The valve in this position simultaneously releases the main brake by actuating the cylinders 58 and 82 and completely releases the drag on the drum. When the valve is moved to the second position fluid communication is directly through line 144 and the ball check valve 146 prevents communication to the drag release cylinder assembly 82. The remaining position of the valve transmits fluid via line 148 to actuate the clutch.

Referring to a combination of FIGS. 2 and 3, the controls will be briefly summarized. The normal position for the control would be that denoted B in FIG. 2 and would include the brake on and the clutch disengaged. For purposes of clarity only the postions will be alphabetically designated. The designation is not intended to denote relative usage of the position not order required. The first position of lever 102 is denoted C in FIG. 2 and releases the drum with the exception of heavy drag, i.e., the principle braking force is released. The second position, denoted D in FIG. 2, is the free spool control and both the main brake and the drag brake are released. The third position denoted A engages the clutch and drives the drum.

As illustrated and described in U.S. Pat. No. 3,756,564, the wrap of the brake on the drum is such that, when the drum is being driven by engagement of the clutch, the rotation is opposite to the wrap of the brake bands thus causing the brake bands to release without the necessity of actuating the brake release cylinders.

Thus, as can be seen, the present invention provides a unique braking system for a winch or other moving cylindrical object as well as providing a unique control system whereby the operator of a tractor-mounted winch can easily perform the necessary functions without having continual and constant hand operations required. Although the construction and operation has been directed primarily to a tractor or vehicle mounted winch, a similar multiple brake mechanism may be utilized to retard or strain rotation of drums in other applications wherein similar resultants are desired.

The same multiple brake release mechanism may also be employed in a braking structure wherein a single brake band is provided for the braking force. It is not required that a plurality of brake bands be utilized to permit the inclusion of the primary brake release and the heavy drag braking mechanism.

The embodiments of the invention in which a particular property or privilege is claimed are defined as follows:

1. A brake mechanism for application of drag and full braking forces to a cylindrical rotating means, comprising:
   a brake band substantially encircling said cylindrical rotating means and adapted to engage a portion of the outer surface thereof, said brake band having a first end immovably fixed relative to the cylindrical means, and intermediate portion and a second end movable relative to said first end,
   A first brake actuator interconnected with the movable second end of said brake band, said first brake actuator including brake applying means for tightening the band by moving the movable second end in the direction of rotation of the cylindrical rotating means and brake releasing means,
   a second brake actuator engageable with said brake band intermediate the ends of the brake band to apply releasable drag braking force to the brake band by moving the intermediate portion of the brake band in the same direction as said first brake actuator moves said movable end of the brake band when tightening the band after said brake releasing means of said first brake actuator has been activated, and
   control means for said brake actuators to selectively apply brake releasing force to said brake actuators.

2. A brake mechanism as in claim 1 wherein the second brake actuator is releasable only after said first brake actuator is moved to brake release position.

3. A brake mechanism as in claim 1 wherein said brake applying means of said first brake actuator includes spring means to apply the braking force, and fluid pressure is employed to energize the brake releasing means to release the braking force.

4. A brake mechanism as in claim 1 wherein said second brake actuator applies a braking force less than said first brake actuator.

5. A brake mechanism as in claim 4 wherein the braking force applied by said second brake actuator is adjustable independent of said control means.

6. A brake mechanism as in claim 1 applied to a winch which includes a rotatable cable winding drum.

7. A brake mechanism as in claim 1 wherein said brake band is wrapped about said cylindrical means in a manner which tightens the band incident to rotation of the cylindrical means when braking pressure is applied by said brake actuators.

8. A brake mechanism in association with a rotatable drum for applying a heavy drag braking force and a full braking force against the same rotational direction of the drum, comprising:
   a first brake band having a pair of ends and substantially wrapping the drum,
   first braking actuating means mounted between the ends of said first brake band for tightening the first brake band about the drum, with a force applied in one direction of rotation of the drum or releasing said first brake band by expanding the band,
   a second brake band having one end secured to one end of the first brake band in a manner to form a continuous spiral wrapping the drum, the other end of said second brake band being secured in an immovable, fixed position whereby the tightening in said one direction of rotation of the drum or releasing of the first brake band produces action of the second brake band similar to the tightening and expanding action of the first band,
   second brake actuating means engageable with at least one of said brake bands for applying drag braking force thereto applied in the same rotational direction as said first brake actuating means by tightening of a band in one direction of rotation of the drum, and
   control means for said first and second brake actuating means for moving said first brake actuating means to the brake release position independent of said second brake actuating means.

9. A brake mechanism as in claim 8 wherein a compression spring is employed in each of said brake actuating means to apply braking force, and fluid pressure is employed to compress the springs and release the braking force.

10. A brake mechanism as in claim 8 wherein a single control means controls for driving the drum and for releasing the braking force of the brake actuators.

11. A brake mechanism as in claim 8 wherein the brake mechanism is applied to a winch which includes a rotatable cable winding drum.

12. A brake mechanism for application of drag and full braking forces in the same direction to a rotatable drum, comprising:
   brake band means spirally wound around said drum, said brake band means including at least one primary band and at least one secondary band, said secondary band having an immovable, anchored end and a movable end, said primary band having a first end interconnected to said secondary band movable end and a second, free end,
   first actuating means anchored at one of its ends and interconnected at the other to the second, free end of said primary band for radially contracting the primary band by constantly tightening the primary band in a rotational direction away from the anchored end of the secondary band and for radially expanding the primary band,
   said first actuating means including first spring means for urging the free end of said primary band in a direction rotationally of the drum toward the first end of said primary band in a tightening direction for radially contracting the primary band, second actuating means including spring means for moving the movable end of said secondary band in the same rotational band tightening direction as said first actuating means tightening said primary band to radially contract the secondary brake band so that the secondary brake band can apply a drag force on the drum when the primary brake band is expanded, and control means for overcoming said first spring means for releasing the primary band so that a drag force is less than the primary brake force can be selectively applied to the drum in the same rotational direction of the drum.

13. The brake mechanism of claim 12, said control means including means for overcoming said spring means of said second actuating means for allowing said secondary band to expand whereby the brake band remains in an expanded, non-braking condition.

* * * * *